March 21, 1933.  C. A. ROWLEY  1,902,525
MIXER
Filed June 12, 1931
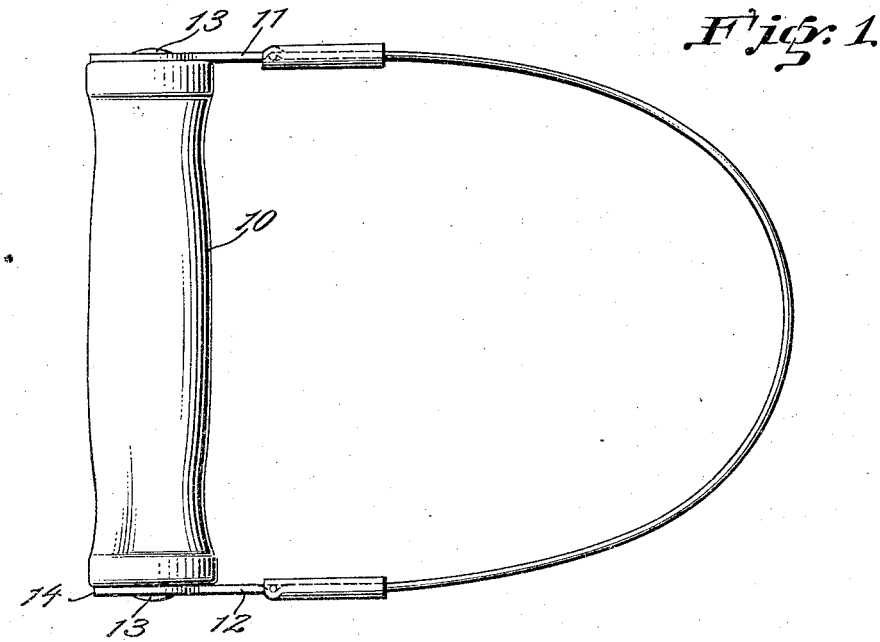
Fig. 1.
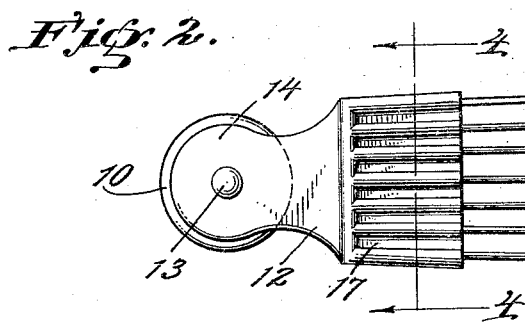
Fig. 2.
Fig. 3.   Fig. 5.   Fig. 4.
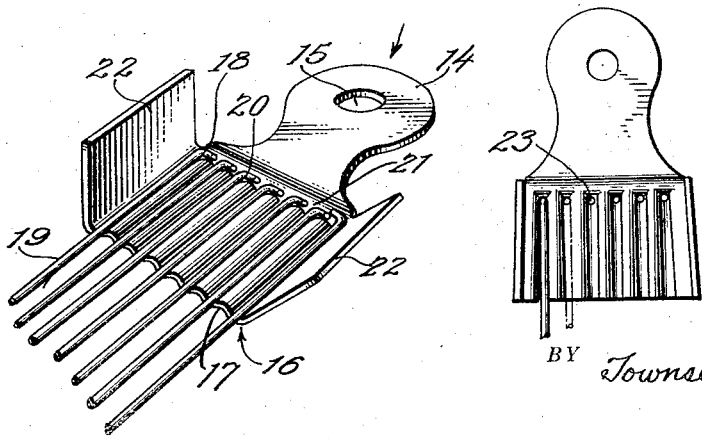
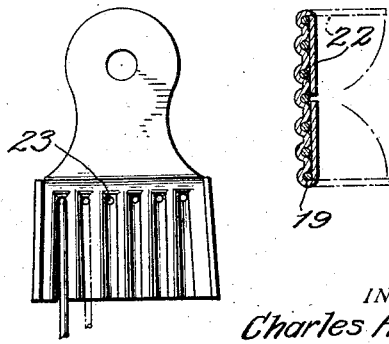
INVENTOR
Charles A. Rowley,
BY Townsend, Loftus & Abbett
ATTORNEYS.

Patented Mar. 21, 1933

1,902,525

UNITED STATES PATENT OFFICE

CHARLES A. ROWLEY, OF LOS ANGELES, CALIFORNIA

MIXER

Application filed June 12, 1931. Serial No. 543,771.

This invention relates to a culinary article and particularly pertains to a device for mixing food ingredients and particularly for mixing shortening with flour.

It is the principal object of the present invention to provide a convenient culinary article or tool which may be used to mix food ingredients, such, for example, as shortening with flour, which requires thorough mixing in order to obtain the proper consistency for making pie crust, pastry and biscuits, and it is the particular object of this invention to provide a novel means of assembling the parts of the structure and permanently holding the mixing blades in their mounting.

The present invention contemplates the provision of a handle at the opposite ends of which mounting blades are secured and within which mounting structures the ends of a plurality of wirelike blades are fastened against removal.

The invention is illustrated by way of example in the accompanying drawing, in which:

Figure 1 is a view in elevation showing a form of the mixer embodying the present invention.

Fig. 2 is a view in side elevation showing the mixer disclosed in Fig. 1.

Fig. 3 is an enlarged view in perspective showing the mixing structure and the manner in which the ends of the blades are nested within the mounting.

Fig. 4 is a view in transverse section through the mounting means as seen on the line 4—4 of Fig. 2.

Fig. 5 is a view in elevation showing another form of the mounting plate provided with perforations to receive the ends of the blades.

Referring more particularly to the drawing, 10 indicates a handle at the opposite ends of which fittings 11 and 12 are secured. These fittings are fastened at right angles to the longitudinal axis of the handle and overhang one side thereof. The fittings may be held in position by a pin extending entirely through the handle or by screws 13. The fittings are more particularly shown in Fig. 3 of the drawing where it will be seen that they comprise a circular plate 14 having a central perforation 15 to receive the fastening elements 13 and which plate is formed integral with a substantially rectangular body plate 16. The body plate is formed with a plurality of longitudinal corrugations 17 which are arranged parallel to each other and form depressions 18 into which mixing blades 19 may line. The blades 19 are here shown as being in the form of wires, preferably made of metal having considerable stability. The ends of these wires are bent at right angles to their longitudinal axis to form the locking tangs 20 which extend around the ends of the corrugations adjacent the plate portion 14 and will prevent the wires from pulling lengthwise of the corrugations. A shoulder 21 is formed at the juncture of the plate portion 14 with the portion 16 and prevents the wires from moving inwardly along the corrugations. The depth of the grooves formed between the corrugations is such as to substantially accommodate the diameter of the wire and to make it possible for locking tangs 22 to be folded over the member 16 and to securely hold the blades 19 in their seated position within the corrugations. The tangs 22 are formed integral with the body portion 16 being struck from the same piece of metal as the plate 14. The manner in which the tangs 22 hold the wire blades 19 in their seated position is particularly shown in Fig. 4 of the drawing. This will prevent lateral movement of the blades 19 while the tangs will hold the hooked locking ends 20 of the wires in a seated position between the shoulder 21 and the ends of the corrugations 17, thus preventing longitudinal movement of the locking wires. It may also be found desirable to arrange the turned locking ends 20 of the blades 19 so that they may pass into locking perforations 23 as shown in Fig. 5 of the drawing, in which event it will be possible to eliminate the shoulder 21 since the blades will be unable to move in any direction.

The blades are substantially semi-circular as shown in Fig. 1 of the drawing, and their opposite ends are secured in the fittings 11 and 12 in the manner previously described.

In the manufacture of the present device the wire blades are first made by being cut to a desired length and then having their locking ends 20 formed. They are then laid in spaced relation to each other upon the body portion 16 of the fittings 11 and 12 and with the separate blades lying in the grooves 18 between the corrugations 17 with the locking ends 20 overhanging the ends of the corrugations as shown in Fig. 3. The tangs 22 are then folded down and may be struck with a hammer by which considerable force may be applied if desired. This will cause the blades to be firmly held in position against movement in any direction. The fittings 11 and 12 may then be secured at the opposite ends of the handle 10 by the fastening device 13, or any other suitable means.

It will thus be seen that a mixing device will in this manner be formed which consists of a few parts permanently fastened together, and within which structure the blades are not liable to become displaced or loosened.

While I have shown the preferred form of my invention, as now known to me, it will be understood that various changes may be made in the combination, construction and arrangement of parts without departing from the spirit of the invention as claimed.

Having thus described my invention, what I claim and desire to secure by Letters Patent is:

1. An article of manufacture comprising a handle, fittings secured at the opposite ends thereof and extending in parallel planes at right angles thereto, mixing wires flexed to assume an arcuate shape and secured within said fittings, the fittings being longitudinally corrugated to receive the individual wires and having a folded over portion to hold the wires within the individual corrugations, said wires being formed with bent end portions engaging the ends of the ribs of the corrugations to prevent the withdrawal of the wires from the fittings after being assembled therewith.

2. In a mixing device characterized by having a plurality of arcuate parallel wire-like blades terminating in end portions extending laterally from the surface of the blades, mounting means therefor comprising a corrugated plate between the ribs of which said blades lie and over the ends of which ribs the laterally extending portions of the blades hook, said plate having a portion adapted to fold over the corrugations to hold the blades in their seated positions.

3. A device of the class described comprising a handle, means providing relatively flat fittings at the ends of the handle, each fitting having inner and outer walls, at least one wall of each fitting being corrugated, a plurality of approximately semi-circular wire blades, the ends of the blades fitting between the inner and outer walls of the fittings and being disposed between the corrugations, the extreme ends of the blades having laterally bent locking tangs positioned over the ends of the ribs of the corrugations to lock the blades in place.

4. A device of the class described comprising a handle, fittings at the ends of the handle, each fitting having a substantially flat corrugated central body portion and laterally extending tangs at the sides thereof foldable over the body portion, and a plurality of approximately semi-circular wire blades having their ends positioned in the corrugations between the body portion and the overfolded tangs, the extreme end of each blade having laterally extending portions extending laterally over the ends of the ribs of the corrugations to lock the blades in position.

5. A device of the class described comprising a handle, fittings at the ends of the handle, each fitting having a substantially flat corrugated central body portion and an ear portion at the top thereof offset with respect to the body portion to provide a shoulder, there being laterally extending tangs at the sides of the body portion foldable over the body portion, and a plurality of approximately semi-circular wire blades having their ends positioned in the corrugations between the body portion and the overfolded tangs, the extreme ends of each blade having laterally extending portions extending laterally over the ends of the ribs of the corrugations and beneath said shoulder to lock the blades in position.

CHARLES A. ROWLEY.